United States Patent [19]

Bryars

[11] E Re. 30,638

[45] Reissued Jun. 9, 1981

[54] MULTI-GAUGE KNIT FABRIC WITH FLEECE INLAY YARN

[75] Inventor: David J. J. Bryars, Leicestershire, England

[73] Assignee: Austen Bryars of London, Inc., Greensboro, N.C.

[21] Appl. No.: 94,170

[22] Filed: Nov. 14, 1979

Related U.S. Patent Documents

Reissue of:

[64] Patent No.: 4,125,001
Issued: Nov. 14, 1978
Appl. No.: 826,059
Filed: Aug. 19, 1977

U.S. Applications:

[62] Division of Ser. No. 640,945, Dec. 5, 1975, Pat. No. 4,043,152.

[51] Int. Cl.[3] ..... D04B 1/04
[52] U.S. Cl. ..... 66/191; 66/9 R
[58] Field of Search ..... 66/9 R, 194, 191, 196, 66/190

[56] References Cited

U.S. PATENT DOCUMENTS

| | | | |
|---|---|---|---|
| 353,652 | 11/1886 | Wrightson | 66/191 |
| 709,840 | 9/1902 | Williams | 66/196 X |
| 876,750 | 1/1908 | Vermilyea et al. | 66/191 |
| 881,494 | 3/1908 | Scott | 66/191 |
| 1,831,964 | 11/1931 | Lombardi | 66/191 |
| 1,976,885 | 10/1934 | Levin | 66/190 |
| 2,052,088 | 8/1936 | Drumheller | 66/190 |
| 2,921,456 | 1/1960 | Evans | 66/196 X |
| 3,986,374 | 10/1976 | Fane | 66/190 |

FOREIGN PATENT DOCUMENTS

| | | | |
|---|---|---|---|
| 450007 | 4/1975 | U.S.S.R. | 66/190 |

*Primary Examiner*—Werner H. Schroeder
*Assistant Examiner*—Andrew M. Falik
*Attorney, Agent, or Firm*—Clifton T. Hunt

[57] ABSTRACT

A double knit fabric of a given gauge (usually fine gauge) is provided with an inlay of a coarser gauge yarn on a knitting machine with two needle beds. One side of the fabric is formed of only relativey fine gauge yarn and the relatively coarser inlay yarn is confined to the other or surface side of the fabric. Selected needles in one of the needle beds are replaced by drive elements. The inlay yarn is laid in by an inlay wheel driven in synchronization with the needle bed by said drive elements.

2 Claims, 10 Drawing Figures

FIG. 3
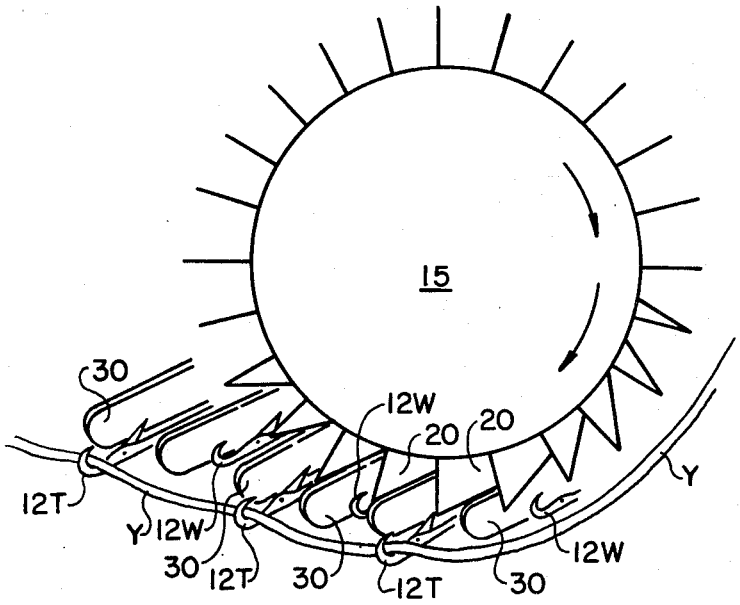
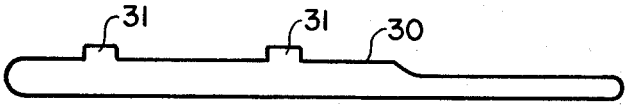
FIG. 4
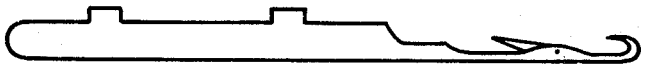
FIG. 4A (PRIOR ART)

MULTI-GAUGE KNIT FABRIC WITH FLEECE INLAY YARN

Matter enclosed in heavy brackets [ ] appears in the original patent but forms no part of this reissue specification; matter printed in italics indicates the additions made by reissue.

RELATED APPLICATIONS

This application is a division of application Ser. No. 640,945, filed Dec. 5, 1975, and entitled INLAY WHEEL AND METHOD (now U.S. Pat. No. 4,043,152 issued Aug. 23, 1977.

BACKGROUND OF THE INVENTION

The majority of double knit machines in existence today are fine gauge machines and more particularly 18 gauge machines. These machines were used to knit the majority of the double knit fabrics used in making slacks and trousers for ladies and gentlemen. But today many of these 18 gauge machines stand idle because of decreased demand for the fabric customarily produced on these machine.

Recently, there has appeared an apparatus utilizing a wheel for inlaying a yarn into fabric being knit on a double knit machine. See British Pat. No. 1,382,286 published Jan. 29, 1975. The inlay wheel in said British Patent comprises a shaft with a drive gear fixed to one end and a plurality of vanes fixed to the other end, each of which successively registers with the space between two adjacent needles in either the dial or cylinder bed, as desired. The drive gear has teeth which mesh with the stems or needles as the needle bed rotates in a conventional manner during knitting. Engagement of successive needle stems with the drive gear on the inlay wheel causes the inlay wheel to rotate on its shaft in the same direction as its associated needle bed and present successive vanes to the needle bed which register with the spaces between successive pairs of adjacent needles. The inlay yarn is trained circumferentially around successive vanes on one side of the inlay wheel and the vanes lay the inlay yarn on selected needles advanced to the tuck position and beneath other needles retained in welt position. The rotation of the inlay wheel delivers the inlay yarn to the needle bed and it is the correspondence in spacing of the gear teeth and the stems of the needles that causes the inlay wheel to rotate and deliver the inlay yarn to selected needles preparatory to being laid in the fabric.

Difficulty has been experienced in the use of the needle stems to rotate the inlay wheel because the critical correlation of spacing between the vanes and the spacing between needles in the needle bed is not reliably maintained; that is the rotation of the vanes on the inlay wheel is not reliably synchronized with the rotation of the dial. Consequently, the vanes sometimes hit the needles instead of meshing with the space between adjacent needles, causing a smash-up.

According to the invention, selected needles are removed (preferably alternate needles to half gauge the machine) to accommodate the inlay of coarse yarn, and the removed needles are replaced with drive elements which provide improved means to rotate the vanes of the inlay wheel in reliably precise synchronization with the rotation of the needle bed. The drive elements are of sturdier stock than the delicate needle stems used in the prior art to impart rotation to the drive gear and the drive elements are provided with butts so as to be under control of the needle cams but the drive elements do not have hooks or latches and play no part in knitting. The drive elements directly contact the vanes to impart rotational movement thereto as the needle bed rotates so that the separate gear of the prior art is eliminated.

The use of the inlay wheel in combination with the novel drive elements enables the production of a novel [two] *fine* gauge ground or body yarn and the surface side is apparently formed of a heavy or coarse gauge yarn; although in reality the heavy yarn is laid in spaced courses and tightly locked in place by stitches of the ground yarn.

SUMMARY OF THE INVENTION

It is an object of the invention to provide a serviceable and decorative multi-gauge fabric [or] *of* novel construction on a conventional fine gauge double knit machine.

It is another object of the invention to provide a novel method and apparatus for producing said fabric on said machine.

BRIEF DESCRIPTION OF THE DRAWINGS

FIG. 3 is [an enlarged] *a somewhat schematic perspective* view of the inlay wheel in use; [and illustrating its relevant spacing to the knitting needles and drive elements]

FIG. 4 is an elevation of a drive element of this invention removed from the machine;

FIG. 4A is an elevation of a prior art knitting needle removed from the machine;

DETAILED DESCRIPTION OF THE INVENTION

Figure 2:
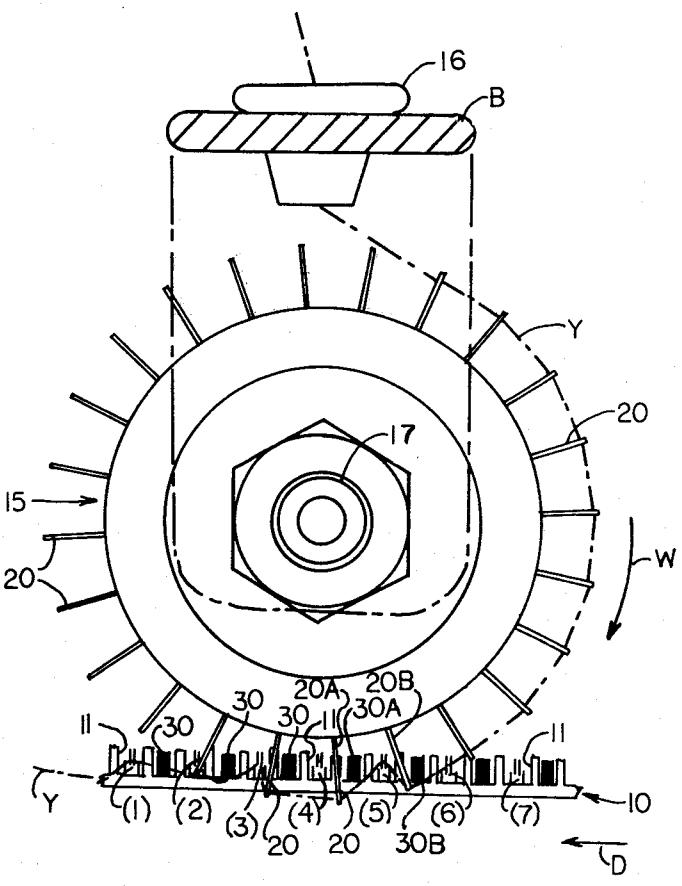
FIG. 2 is a view similar to FIG. 1 but looking at the right side of FIG. 1 and showing the novel drive elements which replace alternate dial needles after the dial has been half-gauged.

Referring more specifically to the drawings, the numeral 10 broadly designates the dial of a double knit machine having a plurality of radially extending grooves or tricks 11 within each of which conventionally radially reciprocable dial knitting needles 12. The machine also conventionally includes a needle cylinder 13 having vertically reciprocable needles 25 whose configuration is the same as the dial needles 12. In the illustrated embodiment, an inlay wheel 15 is associated with the dial 10. The usual form of camming arrangement is provided for operating the dial and cylinder needles, and the usual feed stations are circumferentially spaced around the machine from each of which fabric 14 extends.

It will be understood that the inlay wheel 15 may be associated with the cylinder of the machine and whereas in the construction shown in the drawings the dial and cylinder rotate, these parts may be fixed and the cylinder cam box and the dial cap rotated.

The attachment 15 includes a frame B which is adapted to be secured to the dial cap (not shown). The frame mounts a spindle 17 on which is mounted the inlay wheel 15 having on its periphery, circumferentially spaced and radially extending vanes or blades 20. The circumferential spacing of the blades 20 is approximately the width of two adjacent grooves 11. Thus, as most clearly seen in FIG. 2, adjacent blades 20 straddle adjacent grooves 11. Each blade is provided at its outer end with a V-shaped recess 21 to receive inlay yarn Y.

Figure 1:
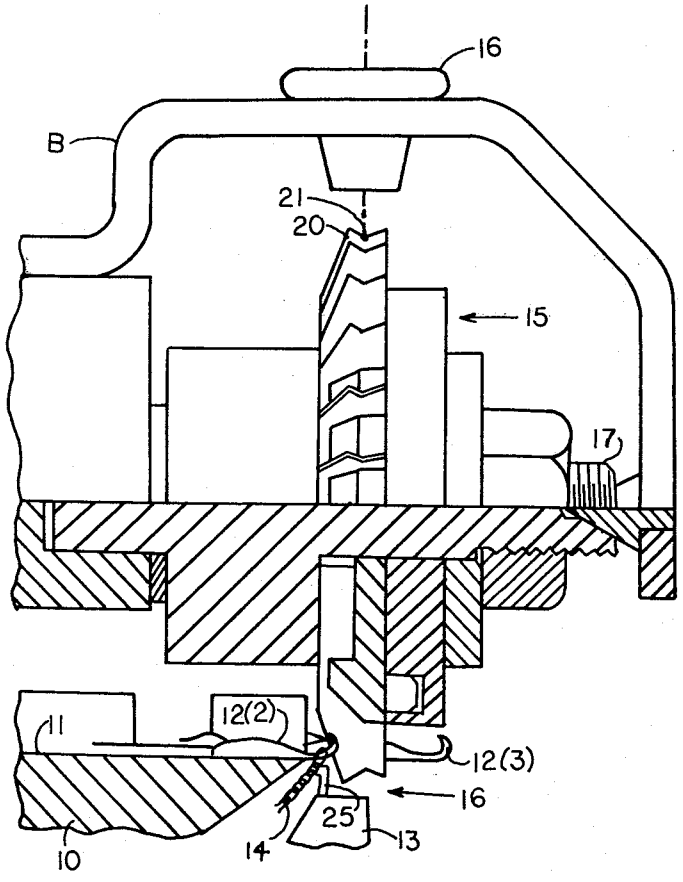
FIG. 1 is a vertical sectional view, partially in elevation, of fragments of the dial and needle cylinder of a double knit machine and an associated inlay wheel.
Figure 5:
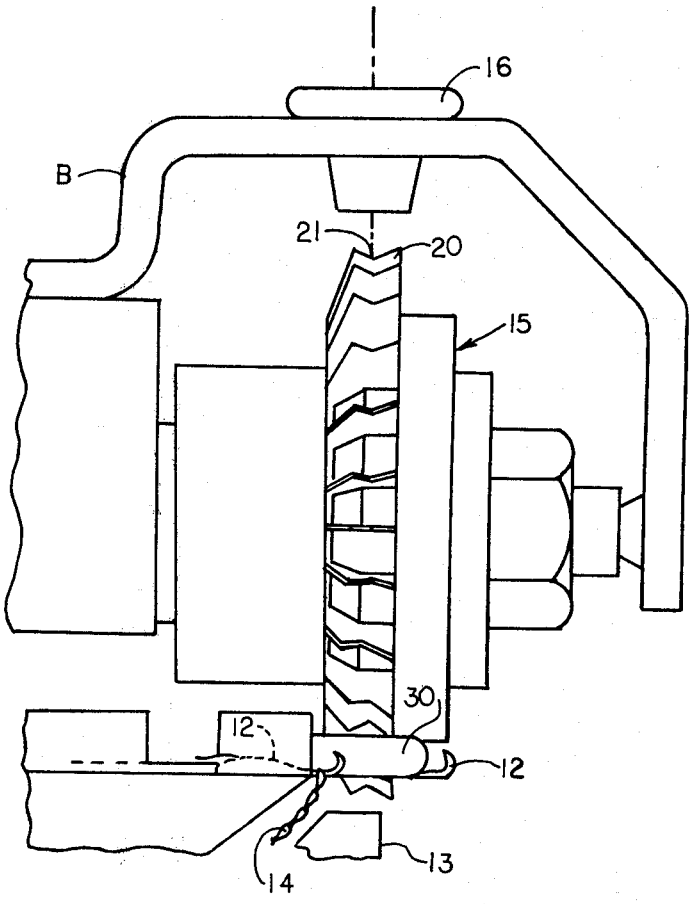
FIG. 5 is a view similar to FIG. 1 but in elevation.

The frame mounts a yarn guide 16 for the inlay yarn Y and tensioning means (not shown) may be provided on the frame so that the tension of the inlay yarn may be adjusted. The guide 16 feeds the inlay yarn to V-shaped recesses 21 as best seen in FIGS. 1 and 5. The attachment is mounted intermediate a pair of thread feeds of the machine at a position which would normally be occupied by a thread feed so that there may be as many inlay attachments as there are thread feeds depending on the effect required in the finished fabric. In the illustrated embodiment, there is an inlay wheel attachment at every eighth feed, as is apparent from FIGS. 6–9.

According to the invention, selected needles are removed from the dial. This serves the dual purpose of providing additional space between dial knitting needles to accommodate a much coarser yarn than the body or ground yarn from which the fabric 14 is knit, and of providing space for the insertion of drive elements 30. In the illustrated embodiment alternate dial needles are removed so that the dial is half-gauged. A drive element is positioned in each of the vacant tricks or grooves 11 from which a dial needle has been removed. Each drive element 30 is dimensioned like the needle it replaces and includes butts 31 engagable with the conventional cams for actuating the elements 30 like the knitting needles during the knitting cycle. The drive elements 30 are under control of the conventional camming and are radially reciprocable within their respective grooves 11 according to a selected pattern. The drive elements differ from the knitting needles only in that the elements are slightly shorter than the needles, the elements do not have any hooks or latches and play no part in the formation of stitches, and the stem of the element is sturdier than the corresponding stem of the needle. The elements 30 function as spacers between needles and as drive members to engage the vanes 20 on the inlay wheel 15 responsive to rotation of the dial in a given direction indicated by the arrow D in FIG. 2. Engagement of vanes 20 by the driving elements 30 imparts rotation to the inlay wheel 15 in the same direction of movement as the dial 10.

Referring to FIG. 2, it will be observed that the peripheral spacing of the vanes 20 on the inlay wheel 15 coincides with the spacing between adjacent elements 30 in the dial 10, it being understood that there is a dial needle 12 between adjacent drive elements 30. Thus, in FIG. 2, it is shown that vane 20A is engaged by drive [elements] *element* 30A just before vane 20B will be engaged by driving element 30B.

With a mechanical set-up as described above, the dial and cylinder needles form the fabric 14 from body or ground yarn such as [15] *75* denier monofilament, for example. The fabric 14 may be of any desired construction such as Ponti Di Roma, Swiss [Bouque] *Pique* or the like. A plurality of inlay wheels 15 are positioned about the circumference of the dial 10, there being an inlay wheel at every eighth feed in the described form of invention to inlay yarn Y at every eighth course of the fabric. The inlay yarn Y is of a higher *denier* yarn such as, for example, 1500 denier and is locked to the fabric 14 formed from the [15] *75* denier ground yarn in such a way as to appear only on the front or surface side of the fabric. In the completed fabric the higher denier inlay yarn Y substantially obscures the fine denier body yarn on the surface of the fabric and gives the appearance the entire fabric is formed of heavy denier yarn when in fact the heavy denier yarn is only laid in every eight courses or more or less as desired.

The inlay yarn Y is locked into the fabric 14 by presenting it from the inlay wheel 15 to selected needles 12t in the tuck position while passing selected needles 12w in the welt position. As most clearly seen in FIG. 3, the selected needles in the tuck position are the alternate odd numbered needles and the selected needles in the welt position are the intervening even numbered needles.

Figure 6:
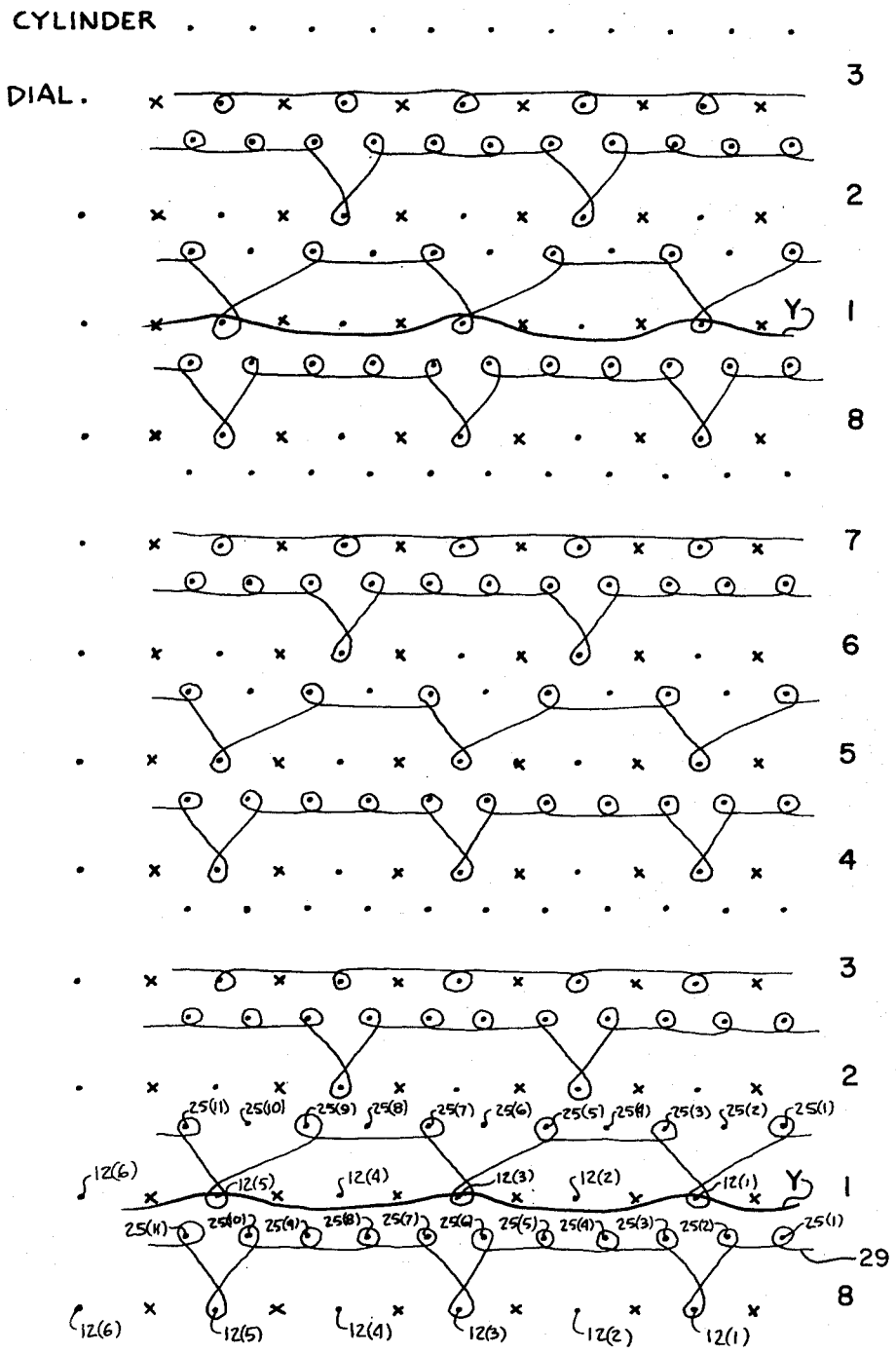
FIG. 6 is a diagram of a first inlay construction.
Figure 7:
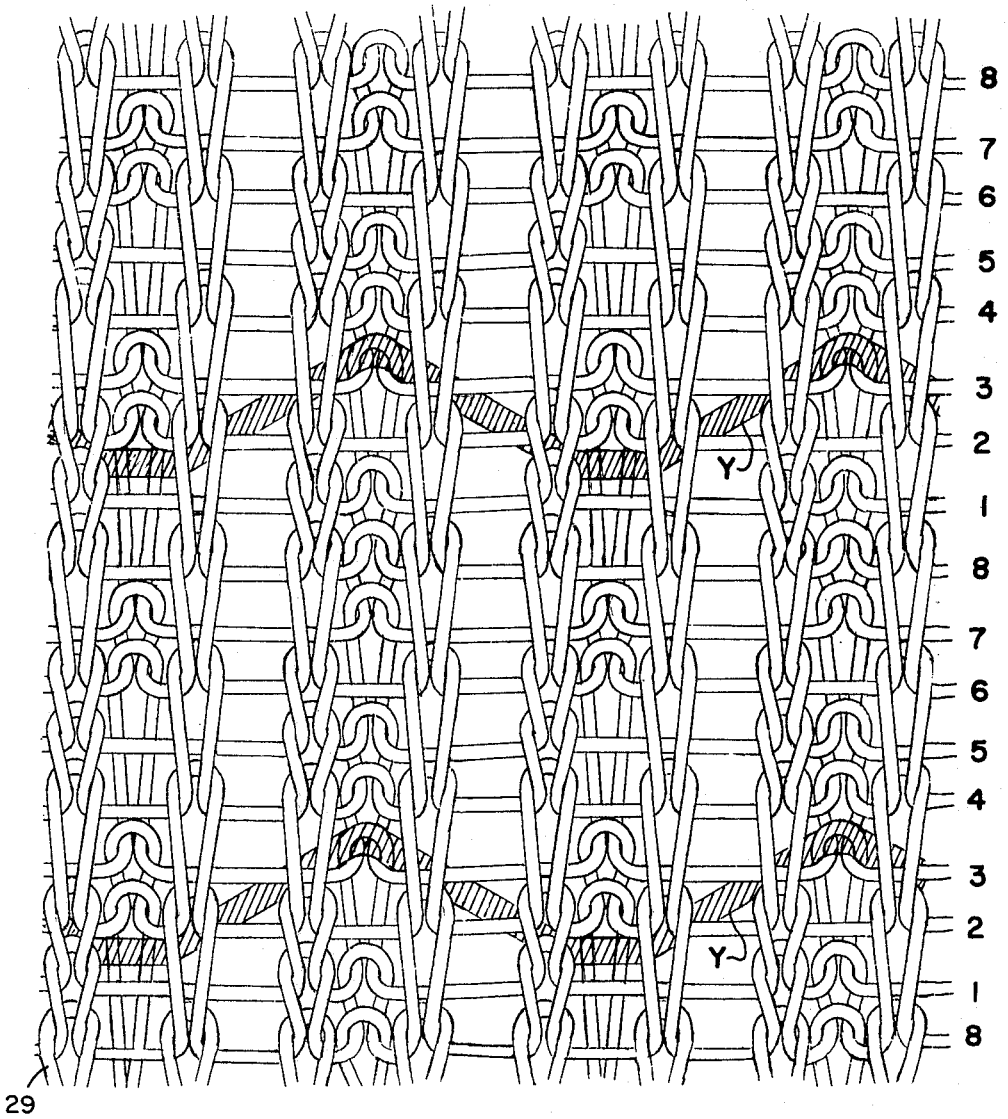
FIG. 7 is a stitch construction according to the diagram of FIG. 6.

According to FIGS. 6 and 7, the inlay yarn Y is layed on the alternate odd numbered dial needles 12(1), 12(3), 12(5) in tuck position and [floated across] *beneath* the intervening [alternate] even numbered dial needles 12(2), 12(4), 12(6) in welt position and also [floated across] *beneath* the space occupied by intervening drive elements 30. Consequently, in the illustrated embodiment of FIGS. 6 and 7 the inlay yarn Y is laid in every [4th] *8th* wale and [floated across] *beneath* the [three] *seven* intervening wales. [, the alternate even numbered of every fourth wale being non-knit] The body yarn 29, according to FIGS. 6 and 7, is knit on [every] *alternate odd numbered* cylinder [needle] *needles (1), 25(3) and 25(5)* in the inlay course 1 and on alternate odd numbered dial needles [12] *12(1), 12(3), 12(5)* in course 1. In course 2 of FIGS. 6 and 7 the body yarn 29 is knit on the *even numbered* dial needles 12*(2), 12(4), 12(6)* [but is not knit] *and* on [any] *all* of the cylinder needles 25. *Course 3 is produced on all the dial needles. The odd numbered dial needles 12(1), 12(3), 12(5) tuck the inlay yarn Y with their previously formed loops in course 1. This action moves the lay of the inlay yarn Y forward two courses within the fabric which effectively locks the inlay yarn Y within the structure of the fabric.* It is apparent from [FIG. 6] *FIGS. 6 and 7* that this arrangement results in the body yarn 29 being knit all around the inlay yarn Y when it is laid on the alternate odd numbered dial needles 12, that is it is confined between body yarn knit in [the same wale in adjacent courses] *alternate dial wales of the same course* and between the body yarns knit in [adjacent wales in the same course] *non-consecutive courses of the same wale.*

Figure 8:
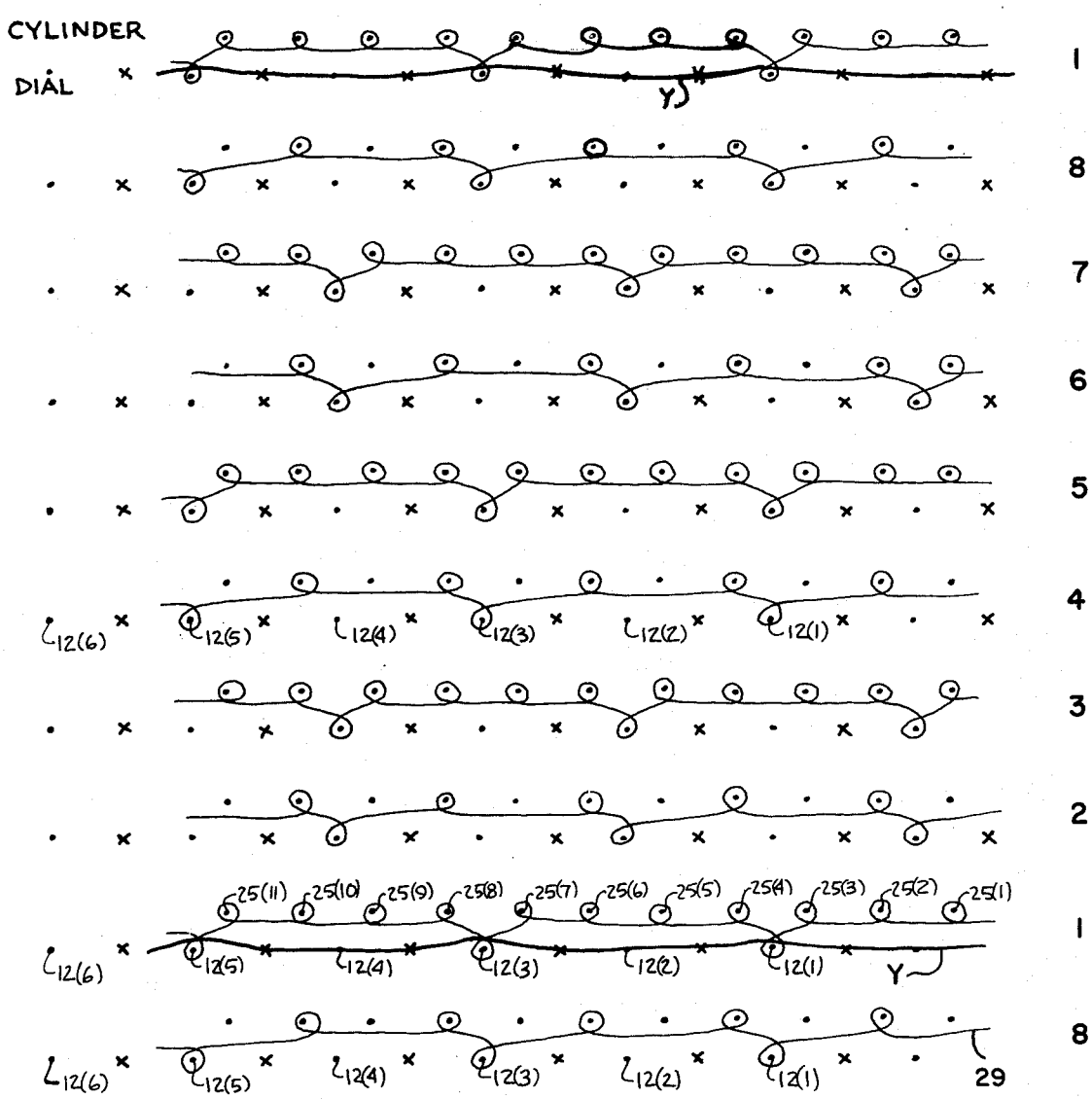
FIGS. 8 and 9 are diagrams of alternate inlay constructions within the scope of the invention.

In the [alternate] *alternative* inlay construction of FIG. 8, the inlay course is also represented at 1 and the inlay yarn Y is laid on the odd numbered dial needles 12*(1), 12(3), 12(5)* in tuck position and [floated across] *beneath* the intervening wales where the even numbered dial needles 12*(2), 12(4), 12(6)* are in welt position. [As in FIG. 6 the] *The* body yarn 29 is knit on all the cylinder needles in course 1 and on the odd numbered alternate dial needles 12. In FIG. 8, however, the inlay yarn Y is locked in position by knitting the body yarn 29 on the same dial needles 12 in course [2] *4* of FIG. 8.

Figure 9:
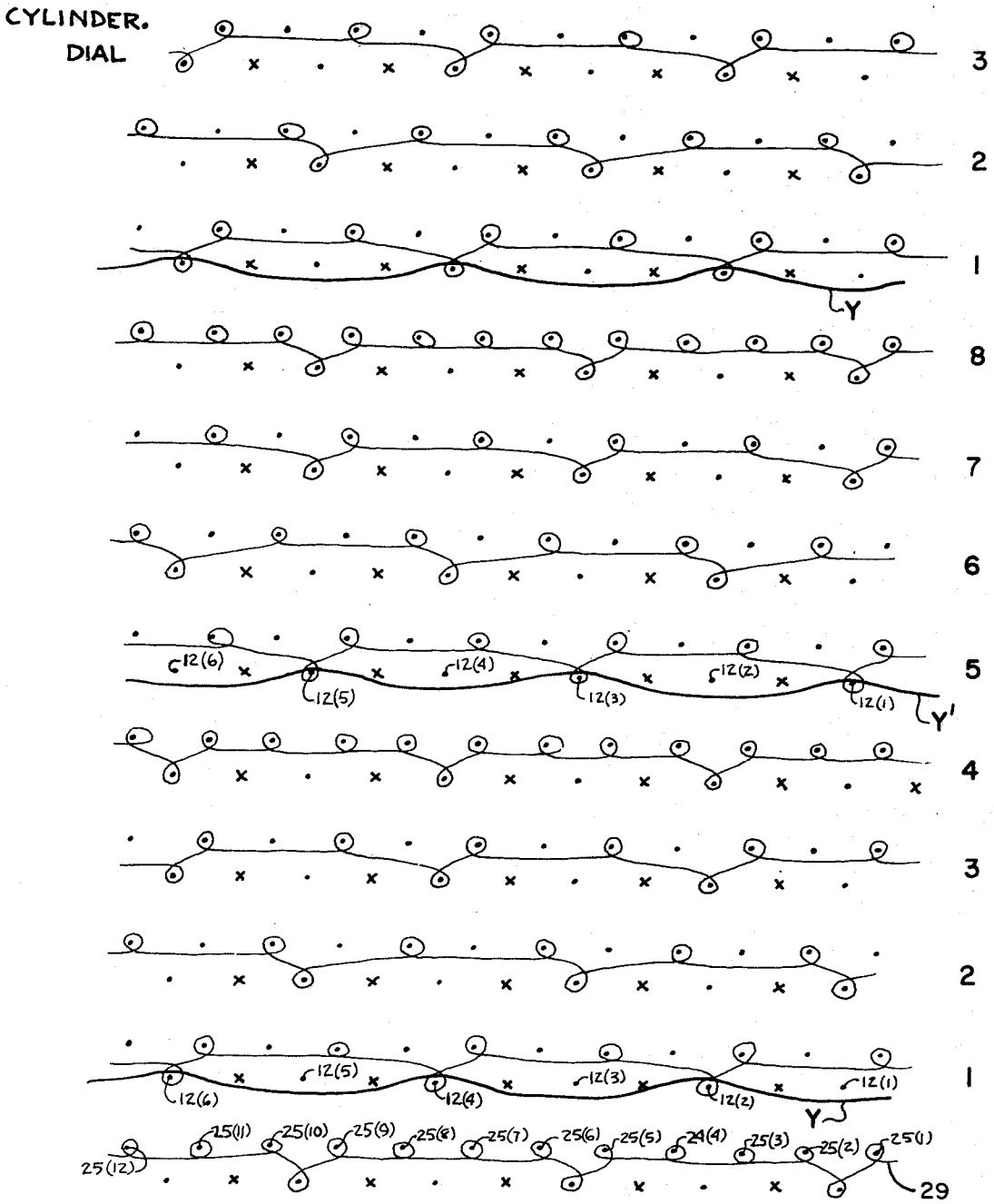

The construction of FIG. 9 [is similar to FIG. 8, the only difference occurring in courses 2 and 6. Courses 2 and 6 of FIG. 9 are the same as the corresponding courses in FIG. 6, where the ground yarn is not knit on the cylinder needles, but is knit on all the dial needles.] *lays yarn in every fourth course, alternate inlay yarns Y being laid on the even numbered dial needles 12(2), 12(4),*

*12(6) and intervening inlay yarns $Y^1$ being laid on the odd numbered dial needles 12(1), 12(3), 12(5). The body yarn 29 is knit on corresponding dial needles in respective inlay courses and on the odd numbered cylinder needles in each inlay course.*

The drive elements 30 are indicated at X in the diagram of FIG. 6 and the effect of the drive elements 30 is shown by the non-knit area in every fourth wale of FIG. 7, there being three wales of knit construction between adjacent element wales.

There is thus provided a novel method of knitting on a conventional fine gauge double knit machine and the resulting fabric which includes a relatively course inlay yarn securely locked in and completely dominating the front or surface side of the fabric, to provide a highly ornamental and useful fabric. The scope of the invention is defined in the following claims.

I claim:

1. A double knit fabric comprising cylinder and dial wales formed from a fine denier body yarn *on a machine*

*with two needle beds* and including a relatively heavy denier inlay yarn confined by body yarn stitches to only one surface of the fabric wherein said inlay yarn is interengaged with stitches of said body yarn only on alternate wales of the same course *defined by one needle bed* and on [consecutive] *non-consecutive* courses of the same wale and wherein every fourth consecutive cylinder and dial wale is non-knit *being defined by the deactivation of selected needles in one of said needle beds.*

*2. A double knit fabric comprising cylinder and dial wales formed from a fine denier body yarn on a machine with two needle beds and including a relatively heavy denier inlay yarn confined by body yarn stitches to only one surface of the fabric where said inlay yarn is interengaged with stitches of said body yarn only on alternate wales of the same course defined by one needle bed and on non-consecutive courses of the same wale and wherein selected wales are non-knit being defined by the deactivation of selected needles in one of said needle beds.*

* * * * *